United States Patent
Rychen et al.

[11] Patent Number: 6,123,851
[45] Date of Patent: Sep. 26, 2000

[54] PROCESS FOR TREATING SEMICONDUCTOR FABRICATION RECLAIM

[75] Inventors: Philippe Rychen, Muespach-le-Haut, France; Thomas Kleiber, Therwil, Switzerland; Dominique Gensbittel, Huningue, France

[73] Assignee: Christ AG, Aesch, Switzerland

[21] Appl. No.: 09/066,314

[22] PCT Filed: Dec. 17, 1996

[86] PCT No.: PCT/CH96/00442

§ 371 Date: Apr. 28, 1998

§ 102(e) Date: Apr. 28, 1998

[87] PCT Pub. No.: WO97/25278

PCT Pub. Date: Jul. 17, 1997

[30] Foreign Application Priority Data

Jan. 4, 1996 [CH] Switzerland .................. 10/96

[51] Int. Cl.[7] .................... C02F 1/28
[52] U.S. Cl. .......... 210/673; 210/660; 210/692; 210/694
[58] Field of Search ................ 210/660, 673, 210/690, 691, 692, 694

[56] References Cited

U.S. PATENT DOCUMENTS

| | | | |
|---|---|---|---|
| 2,366,007 | 12/1944 | D'Alelio | 210/679 |
| 2,500,149 | 3/1950 | Boyer | 521/33 |
| 4,040,990 | 8/1977 | Neely | 521/29 |
| 4,064,043 | 12/1977 | Kollman | 210/690 |
| 4,224,415 | 9/1980 | Meitzner et al. | 521/38 |
| 4,839,331 | 6/1989 | Maroldo et al. | 502/416 |

FOREIGN PATENT DOCUMENTS

| | | |
|---|---|---|
| 0285321 | 10/1988 | European Pat. Off. . |
| 0604110 | 6/1994 | European Pat. Off. . |
| 0623557 | 11/1994 | European Pat. Off. . |
| 62-197308 | 1/1987 | Japan . |

*Primary Examiner*—Ivars Cintins
*Attorney, Agent, or Firm*—Selitto & Associates

[57] ABSTRACT

The hydrophilic organic contaminants and hydrogen peroxide present in semiconductor fabrication reclaims are removed by means of adsorption of a pyrolysate of a macroreticular sulphonated vinyl-aromatic polymer having a carbon content of at least 85% by weight and a carbon/hydrogen atomic ratio of from 1.5:1 to 20:1. In spite of their hydrophobic surface, the pyrolysates have a comparatively high adsorptivity for these contaminants and provide for distinctively higher removal rates than customary activated carbons.

16 Claims, 1 Drawing Sheet

PROCESS FOR TREATING SEMICONDUCTOR FABRICATION RECLAIM

FIELD OF THE INVENTION

The invention relates to a process for removing hydrophilic organic contaminants from semiconductor fabrication reclaims by means of adsorption.

BACKGROUND OF THE INVENTION

In the course of the fabrication of integrated circuits (chips) the wafers must, after certain operations, inter alia after etching, be rinsed with various chemicals and with highly pure water. The reclaim, produced in large amounts, is of a quality, owing to the content of organic and inorganic substances, which makes any direct recycling into the ultra-pure water production circuit impossible. On the other hand, recycling of the reclaim is considerably impeded by the organic contaminants arising from semiconductor fabrication, since it is necessary to achieve TOC values (Total Organic Carbon content) of less than 5 ppb in the ultra-pure water circuit, and these organic contaminants can, as a rule, be removed only inadequately by means of conventional processes such as reverse osmosis, mixed-bed filters, devolatilization, UV irradiation and ultrafiltration.

Typical semiconductor reclaims contain inorganic and organic substances such as, for example, fluoride, chloride, nitrate, sulphate, phosphate and ammonium ions, hydrogen peroxide, isopropanol, acetone, N-methylpyrrolidone, tetramethylammonium hydroxide, methanol, ethanol, butanol, acetic acid, dimethyl sulphoxide, propylene glycol methyl ether acetate and the like. The main constituents usually comprise isopropanol, acetone, N-methylpyrrolidone, hydrofluoric acid, hydrochloric acid, sulphuric acid, phosphoric acid, hydrogen peroxide, ammonia, ammonium fluoride, tetramethylammonium hydroxide and the like. The reclaims may typically have an electrical conductivity of from about 10 to 2,000 $\mu$S/cm and a TOC value of from about 0.1 to 20 ppm. The pH is generally between about 2 and 9, usually below 7.

On the grounds of cost and environmental protection and on the grounds of water scarcity it is desirable for these reclaims, whose overall contaminant content as a rule is distinctly below that of ordinary tap water, to be treated to the extent of them being usable once more in semiconductor fabrication.

The treatment of the reclaims at present makes use of ion exchange processes, reverse osmosis processes, adsorption on activated carbon, biological processes and ultrafiltration. For example, free mineral acids and organic acids are removed routinely via weakly or strongly basic anion-exchange resins. Furthermore, reverse osmosis installations which, in some cases, are already present in the make-up water treatment systems of the ultra-pure water installations are as a rule quite able, together with the existing ion-exchange stages, to remove both inorganic and organic acids, bases and salts to an adequate degree. Hydrogen peroxide and hydrophilic organic compounds such as isopropanol, acetone, N-methylpyrrolidone, methanol, ethanol, butanol, dimethyl sulphoxide and the like, on the other hand, are usually removed only in amounts of about 50–70%, even in reverse osmosis stages, falling far short of the demanded TOC values of less than 5 ppb. In principle, it is possible for the concentrations of these compounds to be further reduced by additional treatment with activated carbon, but even in this manner it is often impossible or at least extremely difficult to achieve satisfactory separation.

The known processes therefore have the drawback that a number of purification methods have to be combined and that nevertheless, particularly in the case of comparatively high concentrations of organic contaminants, satisfactory results often cannot be achieved, and/or biofouling may adversely affect the stages downstream of a biological stage or an activated-carbon filter.

On the other hand, U.S. Pat. No. 4,040,990, JP-A-62/197308, U.S. Pat. No. 4,839,331, EP-A-0604110 and EP-A-0623557, for example, disclose carbonaceous adsorbents which are obtained by pyrolysis of synthetic polymers and, compared with activated carbon, have a more hydrophobic surface and are therefore able to adsorb hydrophobic organic compounds, in particular hydrocarbons and halogenated hydrocarbons, more effectively than activated carbon. Such products are commercially available, e.g., under the brand name Ambersorb (Rohm and Haas, Philadelphia, USA).

EP-A-0285321 further proposed the use of pyrolysates of cross-linked polymers as adsorbents to remove bacterial endotoxins (lipopolysaccharides), which may be present as pyrogens in tap water or in purified water, e.g. as a result of storage. Suitable cross-linked polymers are, for example, styrene-divinylbenzene copolymers which, if required, may have been sulphonated or chloromethylated and then aminated to give an ion-exchange resin. As EP-A-285321 further discloses, this method can also be used in water treatment processes in which highly pure water is produced and stored, by means of the stored water, prior to a subsequent filtration step, being brought into contact with the pyrolysate. In this case, however, the starting material for producing ultra-pure water is tap water, and the adsorption step serves only for the removal of any pyrogens present from the stored highly pure water.

SUMMARY OF THE INVENTION

Surprisingly we have now found that pyrolysates of macroreticular sulphonated vinyl-aromatic polymers are capable of distinctly more effective adsorption of the hydrophilic organic contaminants and hydrogen peroxide present in semiconductor fabrication reclaims than is activated carbon, in spite of the more hydrophobic surface of the former. Moreover, it has been found that the contaminants adsorbed on the said pyrolysates are significantly more readily desorbable than those adsorbed on activated carbon.

The invention therefore relates to a process for removing hydrophilic organic contaminants which are miscible with water at 15° C. in amounts of at least 10% by weight and/or of hydrogen peroxide from semiconductor fabrication reclaims by means of adsorption, which is characterized in that the reclaim is passed through a bed of a pyrolysate of a macroreticular sulphonated vinyl-aromatic polymer having a carbon content of at least 85% by weight and a carbon/hydrogen atomic ratio of from 1.5:1 to 20:1.

It was found that the process according to the invention results not only in considerably better removal rates being achieved, but that also the adsorption capacity of the pyrolysate is usually significantly higher than that of a customary activated carbon. Even with a single adsorption stage having, e.g., a column height (layer height of the bed) of 60 cm, removal rates of far beyond 90% are achieved, as a rule, which is especially surprising since, inter alia, good adsorptivity of hydrophobic pyrolysates for hydrophilic compounds could not have been expected and the contaminants in the reclaims are present only in amounts of a few ppm. It is therefore possible, by means of the process according to the invention, if necessary by connecting two or more adsorption stages in series and/or preferably by means of a combination with the pre-existing make-up water treatment processes, to readily achieve the demanded TOC values of less than 5 ppb. Moreover, the pyrolysates which can be used according to the invention have the advantage, compared with activated carbon which is usually not regenerated, that they can easily be regenerated.

FIG. 1 is a graph showing total organic carbon removal rates, as a percentage of adsorption based on TOC values in feed streams, versus bed volumes of supplied water.

BRIEF DESCRIPTION OF THE DRAWING

The expression "hydrophilic organic contaminant", within the scope of the present invention, refers to non-ionic organic compounds which may be present in semiconductor fabrication reclaims and are miscible with water at 15° C. in amounts of at least 10% by weight, in particular to non-ionic organic compounds which are liquid at 20° C., such as the solvents, employed in semiconductor fabrication, isopropanol, acetone, N-methylpyrrolidone, methanol, ethanol, butanol, acetic acid, dimethyl sulphoxide and propylene glycol ether acetate, in particular isopropanol, acetone and N-methylpyrrolidone.

The expression "vinyl-aromatic polymer", in the scope of the present invention, refers to polymers obtained by polymerization of a vinyl-aromatic monomer.

Figure 1:
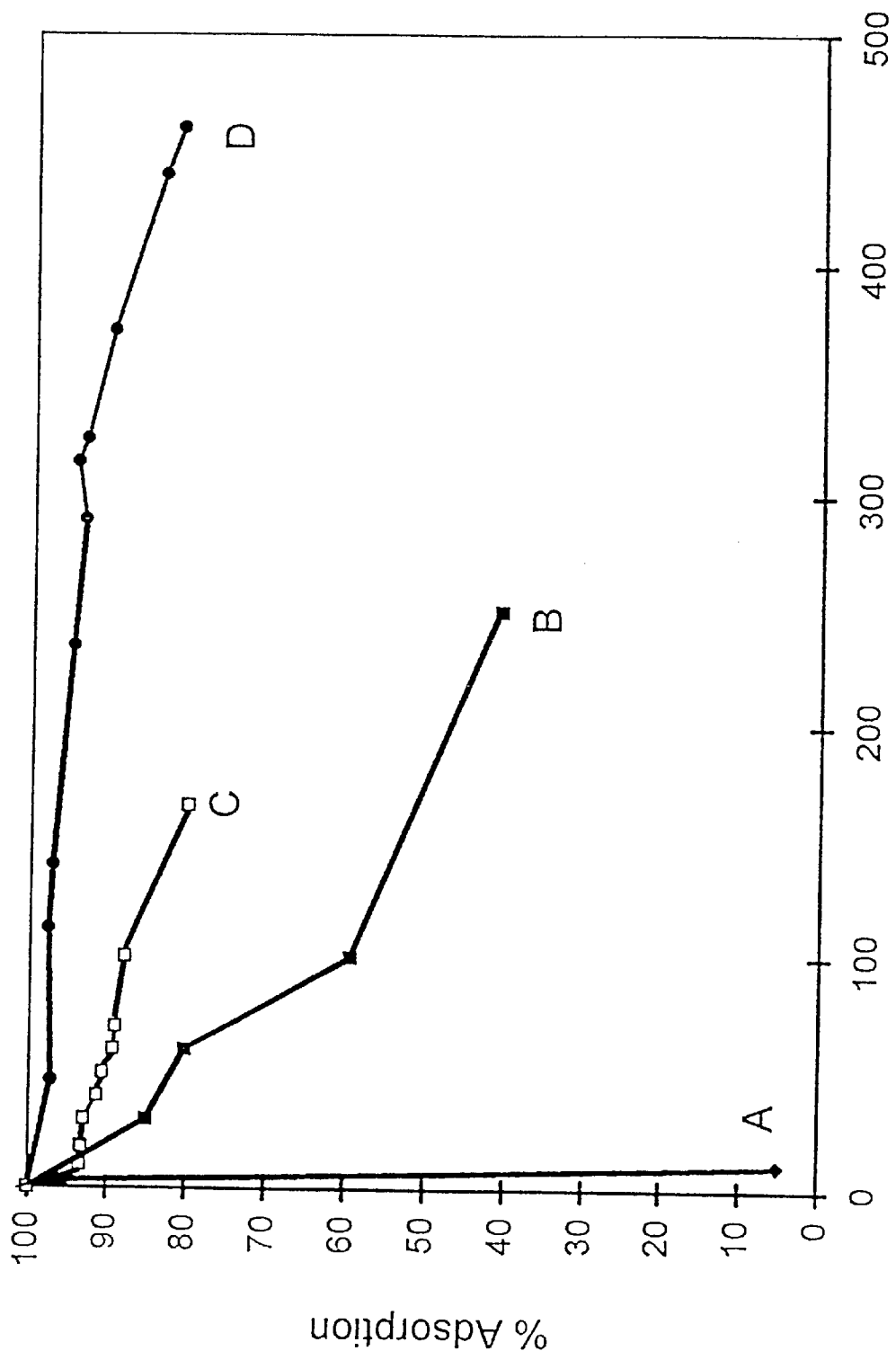

The expression "macroreticular" should be interpreted, within the scope of the present invention, in terms of the polymers in question to a great extent having pores with a pore radius of at least 25 nm.

The pyrolysates which can be used according to the invention expediently have a carbon content of at least 85% by weight and a carbon/hydrogen atomic ratio of from 1.5:1 to 20:1, preferably from 2:1 to 10:1. They can be prepared in a known manner, e.g. in accordance with the methods described in U.S. Pat. No. 4,040,990, U.S. Pat. No. 4,839,331 and JP-A-62/197308, by controlled thermal degradation from macroreticular sulphonated vinyl-aromatic polymers.

Suitable starting polymers are both homopolymers and copolymers of monoethylenically unsaturated monomers such as styrene, vinyltoluene, ethylvinylbenzene, vinylxylene and vinylpyridine, and polyethylenically unsaturated monomers such as divinylbenzene, trivinylbenzene, divinyltoluene and divinylpyridine. Generally, however, preference is given to copolymers from a monoethylenically and a polyethylenically unsaturated polymer. Particular preference is given to styrene-divinylbenzene copolymers, in particular those which were obtained by polymerization of 75–90 parts by weight of styrene with 25–10 parts by weight of divinylbenzene.

The polymerization can be carried out in accordance with known methods, for example as described in U.S. Pat. No. 4,040,990 and U.S. Pat. No. 4,839,331. A preferred method is the suspension polymerization disclosed in U.S. Pat. No. 4,224,415.

The sulphonation of the polymers can likewise be carried out in a known manner, for example by means of concentrated sulphuric acid, oleum, sulphur trioxide or chlorosulphonic acid at elevated temperature. Suitable conditions are known, e.g., from U.S. Pat. No. 2,366,007, U.S. Pat. No. 2,500,149, U.S. Pat. No. 4,224,415 and U.S. Pat. No. 4,839,331.

The pyrolysis of the sulphonated polymers can be carried out, as disclosed e.g. by U.S. Pat. No. 4,040,990 and U.S. Pat. No. 4,839,331, by heating the polymers to a temperature of about 300–1200° C., preferably about 400–800° C., in an inert gas atmosphere (e.g. nitrogen, helium, neon and/or argon) for about 0.3 to 2 hours. If desired, the inert gas may be admixed with an activating gas such as carbon dioxide, oxygen or water vapour, or an after-treatment by heating to about 300–1200° C. in an activating gas can be performed. Pyrolysates which were not treated with an activating gas, however, generally exhibit better adsorptivity for hydrophilic organic contaminants.

In the course of the pyrolysis of the polymers micropores are formed in addition to the pores present in the polymer, which are largely retained during the pyrolysis. In accordance with the pore size definition by IUPAC a distinction can be made, in the pyrolysate, between macropores having a pore radius of more than 25 nm, mesopores having a pore radius of from 1 to 25 nm, and micropores having a pore radius of less than 1 nm, the adsorption presumably taking place largely in the micropores, while the mesopores and macropores facilitate transport to the micropores.

In the adsorption process according to the invention preference is given to the use of those pyrolysates which have macropores having a specific pore volume of at least about 0.1 ml/g, in particular at least about 0.13 ml/g (e.g. 0.20–0.25 ml/g), and mesopores having a specific pore volume of at least about 0.1 ml/g, in particular at least about 0.12 ml/g (e.g. 0.13–0.20 ml/g). Furthermore, as a rule preference is given to pyrolysates which have micropores having a specific pore volume of at least about 0.1 ml/g, particularly preferably at least about 0.2 ml/g (e.g. 0.2–0.4 ml/g). The pore volumes stated in each case correspond to the values obtained on a Micromeritics 2400 porosimeter from the nitrogen adsorption isotherms. The pore volumes stated are not critical, however, and pyrolysates having smaller pore volumes are in principle also suitable.

We have further found, surprisingly, that the adsorptivity of the comparatively hydrophobic pyrolysates for the hydrophilic organic contaminants present in semiconductor fabrication reclaims evidently increases still further as the hydrophobicity of the pyrolysate surface increases. The fact is that pyrolysates which, at room temperature (24° C.) and a relative humidity of 94%, are able to adsorb less than 300 mg of water per g of pyrolysate, proved particularly suitable, in the process according to the invention, for the adsorption of hydrophilic organic contaminants, the best results being achieved with those pyrolysates which are able to adsorb less than 200 mg of water per g of pyrolysate. Regarding the adsorption of hydrogen peroxide, on the other hand, the comparatively less hydrophobic pyrolysates tend to be more suitable, observations showing that pyrolysates which, at room temperature (24° C.) and a relative humidity of 94%, are able to adsorb at least 200 mg, for example 200–400 mg and preferably 200–300 mg of water per g of pyrolysate are more suitable, as a rule, than those which are able to adsorb less than 200 mg of water per g of pyrolysate.

To remove hydrophilic organic contaminants and hydrogen peroxide it is therefore possible, preferably, to employ two pyrolysates of which one is able to adsorb at least 200 mg of water and the other less than 200 mg of water per g of pyrolysate. The process can be implemented in such a way that the reclaim is passed either through a bed of a mixture of the two pyrolysates or successively, in any order, through one bed each of these pyrolysates.

The pyrolysates are highly stable, chemically, thermally and physically. In general they have a specific area of about 100–2000 m²/g, usually about 500–1200 m²/g and can be used, for example, in the form of approximately spherical particles having a mean particle size of, for example, from about 0.2 to 1.5 mm, preferably from about 0.3 to 1.0 mm. Suitable pyrolysates are commercially available, e.g., under the designations Ambersorb 348F, Ambersorb 572, Ambersorb 575, Ambersorb 563 and Ambersorb 564 (Rohm and Haas, Philadelphia, USA), all of them being suitable for the adsorption of hydrophilic organic contaminants and of hydrogen peroxide. Preferably, however, Ambersorb 563 and/or 564 can be used for the adsorption of hydrophilic organic contaminants, and Ambersorb 572 and/or 575 can be used for the adsorption of hydrogen peroxide.

The process according to the invention can be implemented in accordance with the conventional methods for adsorption processes, the pyrolysate bed preferably being arranged in an adsorption filter or a column which can be operated in an up flow process or a down flow process. Generally, a bed height of at least about 30 cm, for example about 60–150 cm is to be recommended. To improve the removal rate, it is in principle possible to increase the bed height; in this case, however, it is generally more advantageous for two or more pyrolysate beds to be connected in series. Downstream of the pyrolysate bed there may preferably be a weakly basic anion exchanger.

If fresh pyrolysates are used it is advisable for deionized water to be passed through the pyrolysate bed for a few days prior to start-up, to hydrate the pyrolysate. This preferably involves hot water being passed through the bed at first, the further treatment being carried out at room temperature.

When the pyrolysate is spent or the removal rate drops below a certain value, e.g. below 90%, the reclaim supply can be interrupted and the pyrolysate can be regenerated, in a cocurrent or countercurrent process, and be reused. The regeneration can preferably be effected by steam having a temperature of from about 100 to 250° C. being passed through the pyrolysate. Generally, fewer than about 12 bed volumes of steam (measured as condensate) are sufficient to substantially remove the adsorbed contaminants.

The flow rates may, for example, during operation be about 5–40 bed volumes of reclaim per hour and during regeneration be about 0.1–2.0 bed volumes of steam (measured as condensate) per hour.

To avoid any interruption of the reclaim treatment during the regeneration it is possible to provide, preferably, two or three pyrolysate beds, one or two of which are in service at any given time, while one bed is being regenerated.

The adsorption process according to the invention is illustrated in more detail by the following example.

EXAMPLE 1

Four columns of transparent poly(vinyl chloride) having a column diameter of 40 cm and a column height of 1.5 m were charged, up to a bed height of 60 cm (bed volume BV=0.75 l) with one adsorbent each, i.e. for comparative purposes (A) Amberlite XAD 16 (Rohm and Haas) and (B) the activated carbon BD (Chemviron) and, according to the invention, (C) Ambersorb 572 (Rohm and Haas) and (D) Ambersorb 563 (Rohm and Haas). For the purpose of hydration in the column, the fresh adsorbents had deionized water flowing through them for 7 days at a flow rate of 1 l/h. Subsequently, in each case during the day, water containing about 10–20 ppm of hydrogen peroxide and having a TOC content of 5.2–6.5 ppm, comprising acetone and isopropanol in a weight ratio of 1:1, was passed through the columns at a temperature of 20–22° C. and at a flow rate of 5 BV/h, and the TOC value and the hydrogen peroxide content in the water flowing out were measured. Overnight the water supply was interrupted in each case. The TOC values in the feed stream and the experimental adsorption capacities until the removal rates dropped to 90% are given in Table 1, together with the removal rates in % for hydrogen peroxide (decrease of $H_2O_2$ in %). The TOC removal rates as % of adsorption based on the TOC values in the feed stream are plotted in FIG. 1 against the bed volumes of supplied water. As the results show, distinctly higher TOC removal rates are achieved with the pyrolysates used according to the invention, which also have higher adsorption capacities.

TABLE 1

| Adsorbent | ppm of TOC in the feed stream | Adsorption capacity in g of TOC/l of pyrolysate | Decrease $H_2O_2$ |
|---|---|---|---|
| (A) Amberlite XAD 16 | 5.2 | 0.03 | 5–10% |
| (B) Carbon BD | 6.5 | 0.08 | 100% |
| (C) Ambersorb 572 | 6.1 | 0.26 | 100% |
| (D) Ambersorb 563 | 5.2 | 1.93 | 40% |

What is claimed is:

1. Process for removing hydrophilic contaminants selected from the group consisting of hydrogen peroxide and hydrophilic organic contaminants which are miscible with water at 15° C. in amounts of at least 10% by weight from a semiconductor fabrication reclaim by means of adsorption, comprising the step of passing the reclaim through a bed of a pyrolysate of a macroreticular sulphonated vinyl-aromatic polymer having a carbon content of at least 85% by weight and a carbon/hydrogen atomic ratio in a range of from 1.5:1 to 20:1.

2. Process according to claim 1, wherein the pyrolysate has macropores having a pore radius of more than 25 nm and a specific pore volume of at least 0.1 ml/g and mesopores having a pore radius of from 1 to 25 nm and a specific pore volume of at least 0.1 ml/g.

3. Process according to claim 1, wherein the pyrolysate has macropores having a pore radius of more than 25 nm and a specific pore volume of at least 0.13 ml/g and mesopores having a pore radius of from 1 to 25 nm and a specific pore volume of at least 0.12 ml/g.

4. Process according to claims 1 or 2, wherein the pyrolysate has micropores having a pore radius of less than 1 nm and a specific pore volume of at least 0.1 ml/g.

5. Process according to claims 1 or 3, wherein the pyrolysate has micropores having a pore radius of less than 1 nm and a specific pore volume of at least 0.2 ml/g.

6. Process according to any one of claims 1 to 3, wherein the pyrolysate has a carbon/hydrogen atomic ratio in a range of from 2:1 to 10:1.

7. Process according to any one of claims 1 to 3, wherein the pyrolysate is able to adsorb, from air at room temperature and a relative humidity of 94%, less than 300 mg of water per g of pyrolysate.

8. Process according to any one of claims 1 to 3, wherein the hydrophilic contaminant to be removed is a hydrophilic organic contaminant miscible with water at 15° C. in amounts of at least 10% by weight, and wherein the pyrolysate is able to adsorb, from air at room temperature and a relative humidity of 94 %, less than 200 mg of water per g of pyrolysate.

9. Process according to any one of claims 1 to 3, wherein the hydrophilic contaminant to be removed is hydrogen peroxide, and wherein the pyrolysate is able to adsorb, from air at room temperature and a relative humidity of 94%, at least 200 mg of water per g of pyrolysate.

10. Process according to any one of claims 1 to 3, wherein the pyrolysate is a styrene-divinylbenzene copolymer.

11. Process according to any one of claims 1 to 3, wherein the pyrolysate is a styrene-divinylbenzene copolymer having a weight ratio styrene/divinylbenzene in a range of from 75:25 to 90:10.

12. Process according to any one of claims 1 to 3, wherein the pyrolysate has a mean particle size of from 0.2 to 1.5 mm.

13. Process according to any one of claims 1 to 3, further comprising the steps of interrupting the flow of the reclaim through the pyrolysate bed and then passing steam having a temperature of from 100 to 250° C. through the pyrolysate bed.

14. Process according to claim 1, wherein the reclaim initially has a total organic carbon content (TOC) in the range of about 0.1 to 20 ppm and the process lowers the TOC to less than about 5 ppb.

15. Process for decontaminating aqueous semiconductor reclaim, comprising:

removing hydrophilic organic contaminants which are miscible with water at 15° C. in amounts of at least 10% by weight and/or hydrogen peroxide by means of adsorption, said adsorption including passing said reclaim through a bed of pyrolysate of a macroreticular sulphonated vinyl-aromatic polymer having a carbon content of at least 85% by weight and a carbon/hydrogen atomic ratio of from 1.5:1 to 20:1.

16. Process according to claim 15, wherein the reclaim initially has a total organic carbon content (TOC) in the range of about 0.1 to 20 ppm and the process lowers the TOC to less than about 5 ppb.

* * * * *